(12) United States Patent
Zhang et al.

(10) Patent No.: US 12,493,807 B2
(45) Date of Patent: Dec. 9, 2025

(54) SYSTEMS AND METHODS FOR ASSESSING RISK OF POTENTIAL DECISIONS

(71) Applicant: Toyota Research Institute, Inc., Los Altos, CA (US)

(72) Inventors: Yanxia Zhang, Foster City, CA (US); Yue Weng, San Mateo, CA (US); Matthew Lee, Mountain View, CA (US); Rumen Iliev, Millbrae, CA (US); Charlene C. Wu, San Francisco, CA (US); Kent Lyons, Los Altos, CA (US)

(73) Assignees: Toyota Research Institute, Inc., Los Altos, CA (US); Toyota Jidosha Kabushiki Kaisha, Toyota (JP)

( * ) Notice: Subject to any disclaimer, the term of this patent is extended or adjusted under 35 U.S.C. 154(b) by 901 days.

(21) Appl. No.: 17/308,482

(22) Filed: May 5, 2021

(65) Prior Publication Data

US 2022/0358383 A1 Nov. 10, 2022

(51) Int. Cl.
| | | |
|---|---|---|
| *G06F 3/048* | (2013.01) | |
| *G06N 5/045* | (2023.01) | |
| *G06N 20/00* | (2019.01) | |
| *G06N 3/08* | (2023.01) | |

(52) U.S. Cl.
CPC ............ *G06N 5/045* (2013.01); *G06N 20/00* (2019.01); *G06F 3/048* (2013.01); *G06N 3/08* (2013.01)

(58) Field of Classification Search
None
See application file for complete search history.

(56) References Cited

U.S. PATENT DOCUMENTS

| | | | |
|---|---|---|---|
| 9,993,166 B1* | 6/2018 | Johnson | A61B 5/4806 |
| 10,338,993 B1* | 7/2019 | Lekivetz | G06N 3/063 |
| 10,504,028 B1* | 12/2019 | Jackson | G06N 20/10 |
| 2010/0268629 A1 | 10/2010 | Ross et al. | |
| 2012/0179501 A1* | 7/2012 | Beresnevichiene | G06Q 10/067 705/7.11 |
| 2015/0186800 A1* | 7/2015 | Kaplow | G06N 5/04 706/12 |
| 2017/0098197 A1* | 4/2017 | Yu | G16H 10/60 |
| 2017/0199944 A1* | 7/2017 | Ashoori | G06F 16/904 |
| 2017/0220751 A1 | 8/2017 | Davis et al. | |
| 2018/0181719 A1 | 6/2018 | Balian | |
| 2020/0160980 A1* | 5/2020 | Lyman | G06N 3/045 |
| 2020/0242526 A1* | 7/2020 | Sampath | G06Q 10/06393 |
| 2020/0279635 A1 | 9/2020 | Letterie et al. | |

(Continued)

FOREIGN PATENT DOCUMENTS

WO 2019175569 A1 9/2019

OTHER PUBLICATIONS

Alpern, "Smartphone Apps Enabling Smarter Decision-Making", IndustryWeek, Oct. 25, 2010, (https://www.industryweek.com/innovation/article/21933696/smartphone-apps-enabling-smarter-decisionmaking).

*Primary Examiner* — Xuyang Xia
(74) *Attorney, Agent, or Firm* — Dinsmore & Shohl LLP (57) ABSTRACT

A method implemented by a processor of a device, the method including determining one or more user values, determining a prompt requiring a decision, and receiving a user selection to one or more choice options related to the one or more user values and pertaining to the prompt requiring a decision. The method further includes comparing the user selection to a risk-neutral utility function and assessing a risk of a potential decision based on the comparison.

19 Claims, 6 Drawing Sheets

(56) References Cited

U.S. PATENT DOCUMENTS

| | | |
|---|---|---|
| 2020/0345287 A1 | 11/2020 | Lau et al. |
| 2021/0025811 A1* | 1/2021 | Carbonelli et al. |
| 2021/0313051 A1* | 10/2021 | Asselmann ............ G16H 40/67 |
| 2022/0129804 A1* | 4/2022 | Dooley .............. G06Q 10/0635 |

* cited by examiner

SYSTEMS AND METHODS FOR ASSESSING RISK OF POTENTIAL DECISIONS

TECHNICAL FIELD

The present specification generally relates to risk assessment systems, in particular, to risk assessment systems that assess the risk of a potential decision based on comparison between user responses to choice options and user values.

BACKGROUND

It is estimated that adults make 35,000 choices, on average, per day. Individuals generally attempt to make the best decisions possible, based on their own unique set of values and priorities with the limited time and information available to them. However, people are prone to making irrational or risky decisions that do not, in fact, align with their personal values and priorities. These risky decisions are often influenced by psychological, cognitive biases and limited time and economic resources. It is difficult for individuals to identify when a decision is deviating from their supposed values in real-time. Moreover, even if an individual is able to realize the decision she is considering does not align with her personal values, it is equally difficult for the individual to identify why she is making a potentially risky decision, or a decision that deviates from her expected behavior.

Accordingly, a need exists for systems that assess the risk of a potential decision to a prompt requiring a decision and inform a user of the risk of the potential decision.

SUMMARY

In one embodiment, a method implemented by a processor of a device, includes determining one or more user values, determining a prompt requiring a decision, and receiving a user selection to one or more choice options related to the one or more user values and pertaining to the prompt requiring a decision. The method further includes comparing the user selection to a risk-neutral utility function and assessing a risk of a potential decision based on the comparison.

In another embodiment, a system includes a device including a processor configured to determine one or more user values, determine a prompt requiring a decision, and receive a user selection to one or more choice options related to the one or more user values and pertaining to the prompt requiring a decision. The processor is further configured to compare the user selection to a risk-neutral utility function and assess a risk of a potential decision based on the comparison.

In yet another embodiment, a processor of a computing device is configured to determine one or more user values, determine a prompt requiring a decision, and receive a user selection to one or more choice options related to the one or more user values and pertaining to the prompt requiring a decision. The processor is further configured to compare the user selection to a risk-neutral utility function and assess a risk of a potential decision based on the comparison.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are directed to systems and methods for determining a risk of a potential decision. The system collects data on a user to determine one or more values of the user that influence the user's decision-making process. The system also collects data to determine a weight of each of the values, indicating an extent to which the user considers each value when making a decision. Based on the weighted values, the system generates a risk-neutral utility function, indicating a perfectly neutral decision-making process that appropriately considers each value of the user. The system compares a potential decision to the risk-neutral utility function to determine the risk of the potential decision. More particularly, the system determines a prompt, or ultimate question the user desires guidance on, requiring a decision. The system then presents the user with one or more choice options pertaining to the prompt requiring a decision and related to the user values. That is, the choice options provide information on the prompt requiring a decision that relate to the values of the user, and the answers or selections to the choice options provide clarity to the user and the system as to what potential decision the user is likely to make. The system may generate an expected utility function based on the answers to the choice options, indicating what values were, in fact, considered by the user, and to what extent, when answering the choice options. By comparing the risk-neutral utility function and the expected utility function, the system may then determine the risk of the potential decision, or the extent that the potential decision deviates from a risk-neutral, anticipated decision or decision-making process of the user. Various embodiments of the risk assessment system and the operation of the system are described in more detail herein. Whenever possible, the same reference numerals will be used throughout the drawings to refer to the same or like parts.

Figure 1:
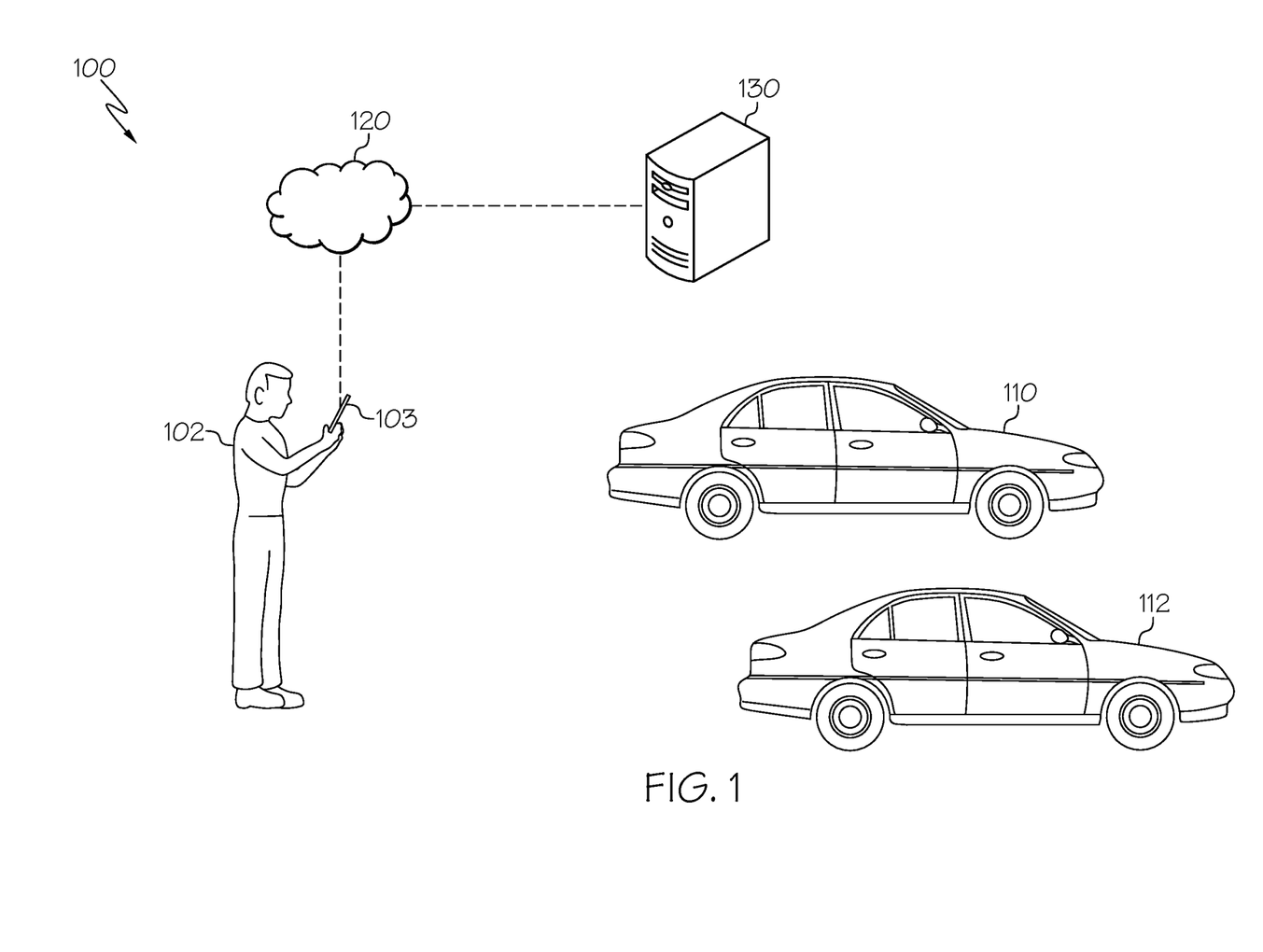
FIG. 1 schematically depicts an example operating environment of the system for assessing a risk of a potential decision of the present disclosure, according to one or more embodiments shown and described herein.

Referring now to the drawings, FIG. 1 schematically depicts an example operating environment of a system 100 for assessing a risk of a potential decision of the present disclosure, according to one or more embodiments shown and described herein. As illustrated, FIG. 1 depicts a user 102 operating a user device 103. The user device 103 may be a personal electronic device of the user 102. The user device 103 may be used to perform one or more user-facing functions, such as receiving one or more inputs from the user 102 or providing information to the user 102. The user device 103 may be a cellular phone, tablet, or personal computer of the user 102. The user device 103 includes a processor for assessing the risk of a potential decision to a prompt requiring a decision. Merely as an example, the prompt requiring a decision may be whether the user should purchase vehicle 110 or vehicle 112, and the potential decision may be to purchase one of the vehicles 110 or 112 over the other.

Figure 2:
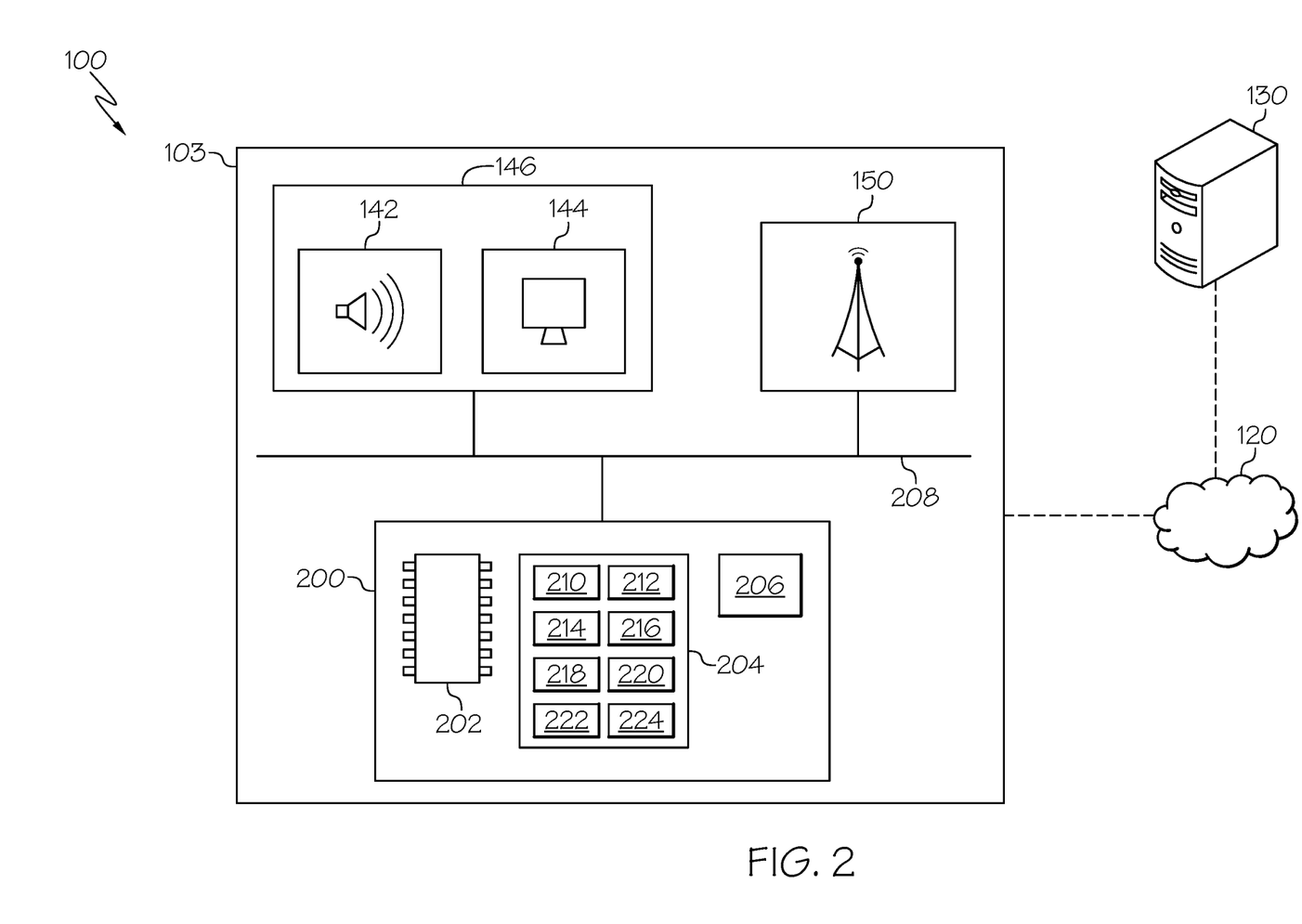
FIG. 2 schematically depicts non-limiting components of the devices of the system for assessing a risk of a potential decision of the present disclosure, according to one or more embodiments shown and described herein.

Referring now to FIG. 2, non-limiting components of the user device 103 of the system 100 for assessing a risk of a potential decision of the present disclosure are schematically depicted, according to one or more embodiments shown and described herein. The user device 103 includes a controller 200 including a processor 202, a memory module 204, and a data storage component 206. The user device 103 may further include an interface module 146, a network interface hardware 150, and a communication path 208. It should be understood that the user device 103 of FIG. 2 is provided for illustrative purposes only, and that other user devices 103 comprising more, fewer, or different components may be utilized.

Referring now to FIGS. 1 and 2, the processor 202 may be any device capable of executing machine readable and executable instructions. Accordingly, the processor 202 may be a controller, an integrated circuit, a microchip, a computer, or any other computing device. The controller 200, including the processor 202, is coupled to the communication path 208 that provides signal interconnectivity between various modules of the user device 103. Accordingly, the communication path 208 may communicatively couple any number of processors 202 within the user device 103 with one another, and allow the modules coupled to the communication path 208 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 208 may be formed from any medium that is capable of transmitting a signal such as, for example, conductive wires, conductive traces, optical waveguides, or the like. In some embodiments, the communication path 208 may facilitate the transmission of wireless signals, such as WiFi, Bluetooth®, Near Field Communication (NFC) and the like. Moreover, the communication path 208 may be formed from a combination of mediums capable of transmitting signals. In one embodiment, the communication path 208 comprises a combination of conductive traces, conductive wires, connectors, and buses that cooperate to permit the transmission of electrical data signals to components such as processors, memories, sensors, input devices, output devices, and communication devices. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The controller 200 of the user device 103 includes the memory module 204. The controller 200, including the memory module 204, is coupled to the communication path 208. The memory module 204 may comprise RAM, ROM, flash memories, hard drives, or any device capable of storing machine readable and executable instructions such that the machine readable and executable instructions can be accessed by the processor 202. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the memory module 204. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Still referring to FIG. 2, the user device 103 comprises network interface hardware 150 for communicatively coupling the user device 103 to the external device 130. The network interface hardware 150 can be communicatively coupled to the communication path 208 and can be any device capable of transmitting and/or receiving data via a network. Accordingly, the network interface hardware 150 can include a communication transceiver for sending and/or receiving any wired or wireless communication. For example, the network interface hardware 150 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 150 includes hardware configured to operate in accordance with the Bluetooth® wireless communication protocol. The network interface hardware 150 of the user device 103 may transmit information on a prompt requiring a decision to the external device 130. The network interface hardware 150 may also receive information and data relating to the prompt requiring a decision from the external device 130.

In some embodiments, the user device 103 may be communicatively coupled to the external device 130 by the network 120. In one embodiment, the network 120 may include one or more computer networks (e.g., a personal area network, a local area network, or a wide area network), cellular networks, satellite networks and/or a global positioning system and combinations thereof. Accordingly, the user device 103 can be communicatively coupled to the network 120 via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth®, Wireless USB, Z-Wave, ZigBee, and/or other near field communication protocols. Suitable cellular networks include, but are not limited to, technologies such as LIE, WiMAX, UMTS, CDMA, and GSM.

The external device 130 may be any database server or electronic device belonging to the user 102 or a third party. For instance, the external device 130 may contain one or more storage devices for storing data pertaining to the operation of the system 100 for assessing a risk of a potential decision. The external device 130 may function as a general database for transmitting data relating to a prompt requiring a decision, as discussed in further detail below.

The user device 103 comprises the interface module 146. The interface module 146 may be coupled to the communication path 208. The interface module 146 includes one or more user/machine interfaces to allow presentation of data or information to the user 102 and/or allow for input of user information to the user device 103. For instance, the interface module 146 may include a visual interface 144. The visual interface 144 may be, for example, a cathode ray tube, light emitting diodes, a liquid crystal display, a plasma display, or the like. Moreover, the visual interface 144 may be a touchscreen that, in addition to providing an optical display, detects the presence and location of a tactile input upon a surface of or adjacent to the visual interface 144. The interface module 146 may also include audial interface 142. The audial interface 142 may include one or more speakers to output an audio message to the user 102. The audial interface 142 may also include a microphone to receive audio input, such as vocal commands, from the user 102.

Referring again to the memory module 204 of the controller 200 of the user device 103, the programming instructions stored in the memory module 204 may be embodied as a plurality of software logic modules, where each logic module provides programming instructions for completing one or more tasks. Each of the logic modules may be embodied as a computer program, firmware, or hardware, as an example. Illustrative examples of logic modules present in the memory module 204 include, but are not limited to, value logic 210, prompt logic 212, data receiving logic 214, choice option logic 216, communication logic 218, utility function logic 220, risk logic 222, and neural network training logic 224.

The value logic 210 includes one or more programming instructions for determining, and assigning weights to, values of the user 102. As used herein, the term "value" generally refers to the personal principles held by the user 102. The values of the user 102 may also be thought of as the core beliefs and convictions that the user 102 bases her life and decisions on. Merely as examples, user values may include personal health and fitness, economic frugality, environmental friendliness, a preference for local businesses, loyalty, higher learning, privacy, and charitableness. It should be appreciated that any number and combination of values, beyond those listed, may be important to the user 102.

The value logic 210 includes programming instructions for receiving input from the user 102 providing a list of values important to the user 102. The value logic 210 also includes programming instructions for predicting the values of the user 102. For instance, the value logic 210 may include programming to predict the values of the user 102 based on user-specific data and/or community data. For instance, the controller 200 may receive information concerning the age, gender, address of residence, education, and/or profession of the user 102 and predict the values of the user 102 based on the information. The user-specific information used to predict the values of the user 102 may be stored in the data storage component 206 and derived from one or more applications associated with the user device 103. For instance, the values of the user 102 may be predicted based on information derived from a personal email application of the user device 103, a personal calendar application of the user device 103, a personal banking application of the user device 103, and the like.

The value logic 210 may also include programming to leverage community data to predict the values of the user 102. For example, through the external device 130 and network interface hardware 150, the controller 200 may receive information on the values of other users in the same demographic, geographic community, or in the personal contacts of the user device 103 of the user 102 and use this information to predict the values of the user 102. The value logic 210 may also include programming instructions to assign a weight to each of the values of the user 102. The value logic 210 therefore includes programming for receiving input from the user 102 providing a weight to each of the values of the user 102. The weight may be a numerical value associated with the importance of the personal value of the user 102. For instance, a first personal value with a weight of 10 may be considered more important to the user 102 than a second personal value with a weight of 2. The value logic 210 also includes programming to predict the weights of the values of the user 102 based on user-specific data and/or community data.

The prompt logic 212 includes one or more programming instructions for determining a prompt requiring a decision. The prompt logic 212 includes programming instructions for receiving input from the user 102 providing a prompt requiring a decision. The prompt requiring a decision may be a question requiring an answer. For instance, the prompt may be a single question that the user 102 desires a yes or no answer to, such as, "Should I buy vehicle X?" (e.g. the vehicle 110). The prompt may also be a question with multiple, but limited, possible answers, such as, "Should I buy car X, Y, or Z?" (e.g. the vehicles 110 and 112). The prompt may also be a general informational prompt, such as, "I'm thinking about buying a car."

The user 102 may provide the prompt requiring a decision through the interface module 146. The prompt logic 212 may also include programming for generating a prompt requiring a decision based on user-specific data or information. The user-specific information may be stored in the data storage component 206 and derived from one or more applications associated with the user device 103, as discussed above. For instance, the prompt logic 212 may include programming to determine, based on correspondence in a personal email application of the user device 103 or an electronic receipt saved on the user device 103, that a vehicle lease of the user 102 is expiring in the near future.

The prompt logic 212 may also include programming to generate a prompt such as, "Do you want help deciding to buy or lease a vehicle?" The prompt may be presented to the user 102 along with a notification, allowing the user 102 to ignore the prompt or begin a risk assessment exercise regarding the generated prompt. While the prompts discussed as examples have been particularly related to purchasing or leasing a vehicle, it should be understood that the prompt may relate to any number of decisions that the user 102 must make or desires assistance making. For instance, the prompt requiring a decision may relate to purchasing a house, receiving a vaccine or other medical procedure, what to eat for dinner, whether to take a vacation, and the like.

The data receiving logic 214 includes one or more programming instructions for receiving data from the external device 130. That is, the data receiving logic 214 includes programming to cause a connection between the network interface hardware 150 and the external device 130 such that data transmitted by the external device 130 is received by the controller 200. Further, the data transmitted by the external device 130 may be stored (e.g., within the data storage component 206). The data transmitted by the external device 130 may relate to the prompt requiring a decision. For instance, the network interface hardware 150 may communicate a prompt requiring a decision that is determined with the prompt logic 212 to the external device 130, soliciting data from the external device 130 relating to the prompt requiring a decision. For example, if the prompt requiring a decision relates to whether the user should purchase vehicle 110 or vehicle 112, where the vehicles 110, 112 are different makes and/or models, for instance, the external device 130 may transmit data to the controller 200 including statistics, data, and information on vehicle 110 and vehicle 112.

The choice option logic 216 includes one or more programming instructions for generating choice options for the user 102. The choice options are questions or tasks pertaining to the prompt requiring a decision. The choice options also relate to the values of the user 102. For instance, the values of the user 102 may be economic frugality, preference for locally sourced products, and environmental friendliness, and the prompt requiring a decision may relate to purchasing a vehicle. In such a case, the one or more choice options will pertain to the prompt requiring a decision in that the one or more choice options will allow the user 102 to indicate whether the user 102 is interested in purchasing the vehicle in question or not. The choice options generated will relate to the values of the user 102 in that the choice options will present information to the user 102 on the cost, environmental impact, and location of manufacture of one or more vehicles being considered to purchase.

In a first example, the choice options may present the cost, environmental impact, and location of manufacture of the vehicle 110 and ask the user 102 if she wishes to purchase the vehicle 110 with that knowledge. As another example, the choice options may present the cost, environmental impact, and location of manufacture of the vehicle 110 and the vehicle 112 and ask the user 102 if she wishes to purchase the vehicle 110 or the vehicle 112 with that knowledge. As yet another example, the one or more choice options may present the cost, environmental impact, and location of manufacture of the vehicle 110, the vehicle 112, and a third vehicle X (not depicted) and ask the user 102 to rank the vehicles in order of preference with that knowledge.

Each choice option may relate to a single value of the user 102. For instance, a first choice option may ask the user 102 to state a preference between the vehicle 110 and the vehicle 112 based on the emissions, miles per gallon, and other environmental statistics relating to the vehicles. A second choice option may ask the user 102 to state a preference between the vehicle 110 and the vehicle 112 based on the purchase price of the vehicles, average cost of repair, and other economic statistics relating to the vehicles. In other cases, each choice option may relate to a combination of values of the user 102. For instance, a single choice option may be generated that presents all data on the vehicle 110 and the vehicle 112 relating to the values of the user 102. As an example, the cost, environmental impact, and location of manufacture of the vehicle 110 and the vehicle 112 may be presented to the user 102 at once and the user 102 may be prompted to state a preference between the two vehicles. The data and information of the vehicles 110, 112 presented in the choice options may be provided by the external device 130 based on the prompt requiring a decision, as discussed above. The choice option logic 216 may include programming to filter the data provided by the external device 130 on the vehicle 110 and the vehicle 112 and present only information related to the values of the user 102 in the generated choice options.

The communication logic 218 includes one or more programming instructions for communicating with the user 102 through the interface module 146. For instance, the communication logic 218 may include programming that allows information to be provided to, and received from, the user 102 in the form of a chat bot. For example, choice options may be presented on the visual interface 144 in the form of text, and the user 102 may type responses or otherwise provide selections (e.g. answering a multiple choice question) to the choice options. The communication logic 218 also includes programming that allows information to be provided to, and received from, the user 102 audibly. For instance, choice options may be presented to the user 102 as an audial message through the audial interface 142, and the user 102 may respond to the choice options through voice commands and responses through the audial interface 142.

The user 102 may interact with the system visually and audibly simultaneously. For instance, choice options may be presented to the user 102 as text, and the user 102 can respond to the choice options through voice command. The communication logic 218 may also include programming that allows the user 102 to provide information to the controller 200 through a camera of the user device 103. For instance, the user 102 may take a photo or video of a particular vehicle, and the prompt logic 212 may include programming to generate a prompt requiring a decision, such as, "Are you interested in purchasing the vehicle in the photo?" based on the photo. If the user 102 answers in the affirmative, the system may begin a risk assessment exercise regarding the purchasing of the photographed vehicle.

The utility function logic 220 includes one or more programming instructions for generating utility functions. The utility function logic 220 includes programming that allows for the generation of a risk-neutral utility function based on the values of the user 102. The risk-neutral utility function may be a linear combination of the weighted values of the user 102. The risk-neutral utility function represents a decision of the user 102 having no risk. For instance, the risk-neutral utility function effectively indicates that when making a decision, the user 102 should consider a first value of the user 102, such as economic frugality to a first extent indicated by the weight of the value, and the user 102 should consider a second value, such as environmental friendliness, to a second extent indicated by the weight of the value.

The utility function logic 220 also includes programming that allows for the generation of an expected utility function based on the responses to the choice options provided by the user 102. For instance, the utility function logic 220 includes programming to fit a learned model to the responses to the choice options provided by the user 102 to generate the expected utility function. The expected utility function represents a combination of weighted values of the user 102 based on the responses to the choice options. In other words, the expected utility function effectively represents what values the user 102 is actually considering in answering the choice options, and to what extent the user 102 is weighing or considering each of the values.

The risk logic 222 includes one or more programming instructions for assessing a risk of a potential decision of the user 102. For instance, the risk logic 222 may include programming to determine a distance between the risk-neutral utility function of the user 102 based on the values of the user 102 and the expected utility function of the user 102 based on the responses to the choice options. More particularly, the risk logic 222 may include instructions to plot a curve generated from the risk-neutral utility function and a curve generated from the expected utility function in space, and determine a distance between the two curves. The greater the distance between the risk-neutral utility function and the expected utility function, the greater the risk of the potential decision indicated by the answers provided by the user 102 to the choice options.

Risk, as described herein, may be considered as the magnitude of the distance between the risk-neutral utility function and the expected utility function. For instance, the user 102 may be a naturally risk-seeking person, or a person who values financially aggressive decisions, for example. If the responses provided to the choice options indicate that the user 102 is approaching the prompt requiring a decision with a conservative financial approach, this discrepancy may still be considered a "risk" herein, as it deviates from the anticipated or traditional decision-making process and values of the user 102. The risk logic 222 may also include programming to determine whether a potential decision to the prompt requiring a decision based on the responses to the choice options provided by the user 102 is risk-seeking or risk-averse. That is, based on the comparison between the risk-neutral utility function and the expected utility function, the potential decision provided by the user 102 may be determined to be more or less risky (risk-seeking or risk-averse) than the expected behavior of the user 102 based on her values.

Whether a potential decision is a risk, either risk-averse or risk-seeking, may be determined based on the magnitude of the distance between the risk-neutral utility function and the expected utility function. That is, if the magnitude of the distance between the risk-neutral utility function and the expected utility function exceeds a pre-determined threshold, the potential decision may be a risk. In contrast, if the magnitude of the distance between the risk-neutral utility function and the expected utility function does not exceed the pre-determined threshold, the potential decision of the user 102 may not be a risk. Merely as an example, if the responses to the choice options provided by the user 102 exactly align with the values of the user 102, there may be no distance between the risk-neutral utility function and the expected utility function, indicating that the potential decision exactly aligns with the values of the user 102 and there is no associated risk with the potential decision.

The risk logic 222 may also include programming for identifying a decision to the prompt requiring a decision that minimizes risk for the user 102. That is, the risk logic 222 may include programming for generating an expected utility function associated with each possible decision to the prompt requiring a decision. For instance, if the prompt requiring a decision is whether the user 102 should purchase vehicle 110, vehicle 112, or a third vehicle (not depicted), an expected utility function may be generated for the decision to purchase each of the vehicles. The distance between each expected utility function and the risk-neutral utility function may be measured, and the expected utility function closest to the risk-neutral utility function may be identified. Therefore, the risk logic 222 may include programming to inform the user 102 of the decision to purchase the vehicle that minimizes risk based on the values of the user 102.

The neural network training logic 224 includes one or more programming instructions for utilizing a neural network or other machine learning model to adjust or improve the operation of one or more other logic modules of the memory module 204. For instance, the neural network training logic 224 may include programming to train the utility function logic 220 to improve the accuracy of the modeling used to determine the expected utility function. The neural network training logic 224 may also include programming for training the value logic 210. For instance, the values of the user 102 may change over time. The values the user 102 deems important as a student may not be the same values the user 102 deems important as an employed graduate. The values of the user 102 may also gradually shift as the user 102 ages.

The values of the user 102, and the weights of the values, may be re-determined over time, for instance. As an example, economic frugality may initially be considered a core value of the user 102 with a large weight associated with it. However, if the user 102 continuously shows a preference for spending large sums of money or making risky financial investments based on the responses to choice options generated for different prompts requiring a decision, it may be determined that the user 102 is not as frugal as initially determined. Accordingly, the economic values and weights of the values of the user 102 may be learned and adjusted over time.

Still referring to FIGS. 1 and 2, data storage component 206 may generally be a storage medium. Data storage component 206 may contain one or more data repositories for storing data that is received and/or generated. The data storage component 206 may be any physical storage medium, including, but not limited to, a hard disk drive (HDD), memory, removable storage, and/or the like. While the data storage component 206 is depicted as a local device, it should be understood that the data storage component 206 may be a remote storage device, such as, for example, a server computing device, cloud based storage device, or the like. Illustrative data that may be contained within the data storage component 206 includes, but is not limited to, value data, value weight data, prompt data, choice option data, utility function data, risk assessment data, and training data.

The value data may generally be data that is used by the controller 200 to determine values of the user 102. The value weight data may generally be data that is used by the controller 200 to determine weights of the values of the user 102. The prompt data may generally be data that is used by the controller 200 to determine a prompt requiring a decision from the user 102. The choice option data may generally be data that is used by the controller 200 to determine choice options pertaining to the prompt requiring a decision and related to the values of the user 102. The utility function data may generally be data that is used by the controller 200 to determine the risk-neutral utility function based on the values of the user 102 and the expected utility function based on the user 102 responses to the choice options. The risk assessment data may generally be data that is used by the controller 200 to assess the risk of a potential decision to the prompt requiring a decision. The training data may generally be data that is generated as a result of one or more machine learning processes used to improve the accuracy of the risk-neutral utility function and expected utility function, for instance.

Figure 3:
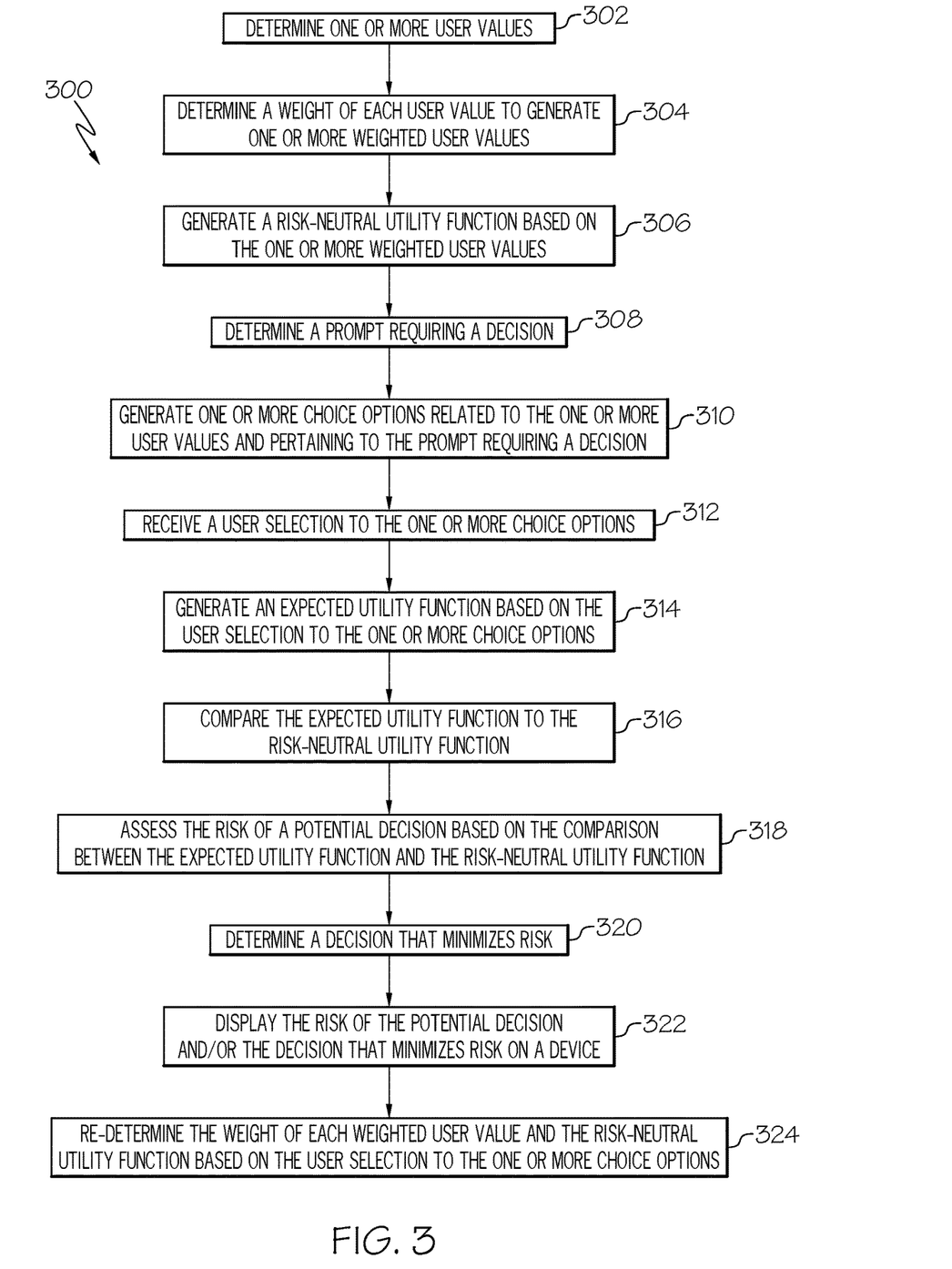
FIG. 3 depicts a flowchart for a method of assessing a risk of a potential decision, according to one or more embodiments shown and described herein.
Figure 4:
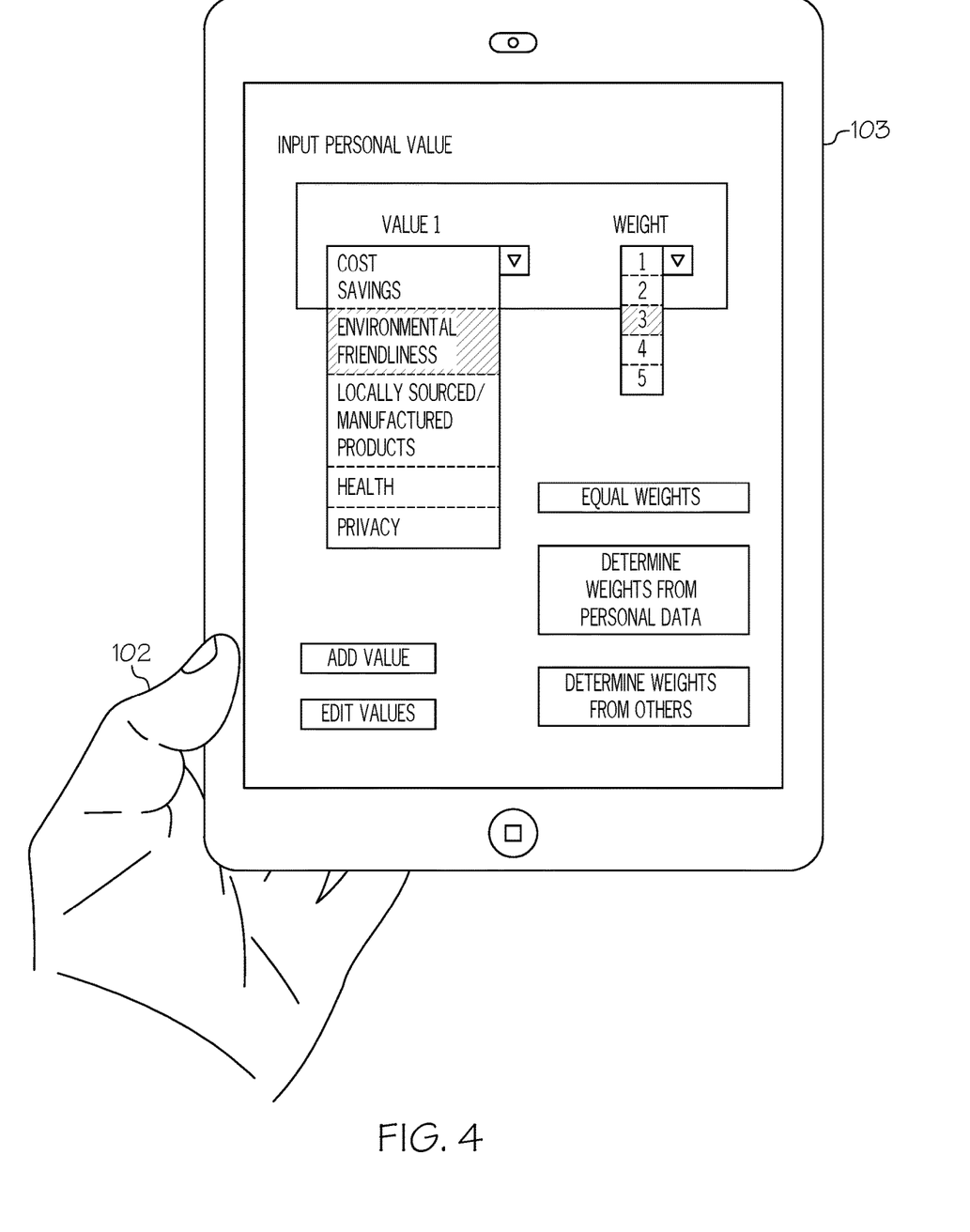
FIG. 4 schematically depicts an example user profile screen on a user device of the system of FIG. 2, according to one or more embodiments shown and described herein.
Figure 5:
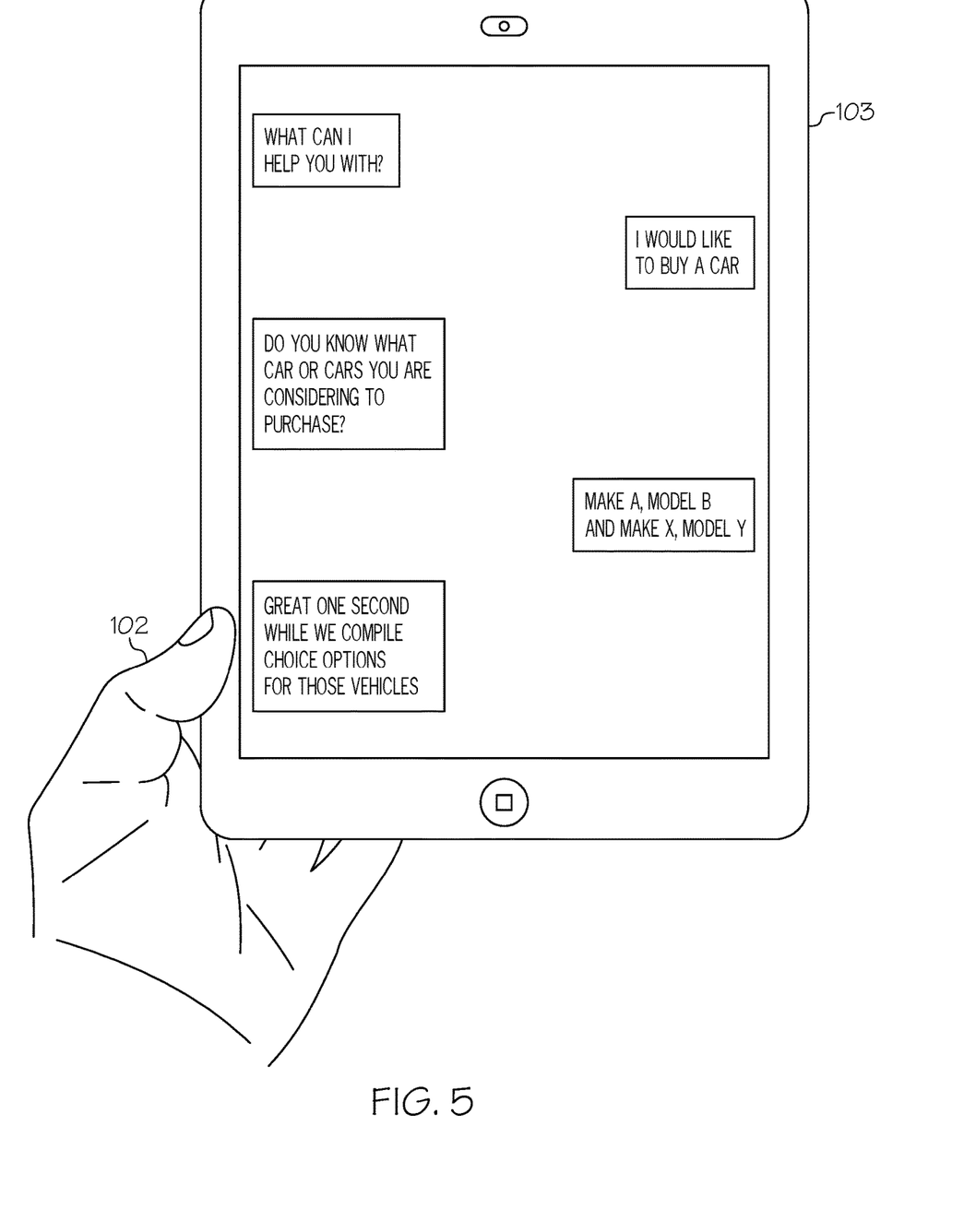
FIG. 5 schematically depicts an example interaction between a user and the system of FIG. 2 on a user device of the system of FIG. 2, according to one or more embodiments shown and described herein.
Figure 6:
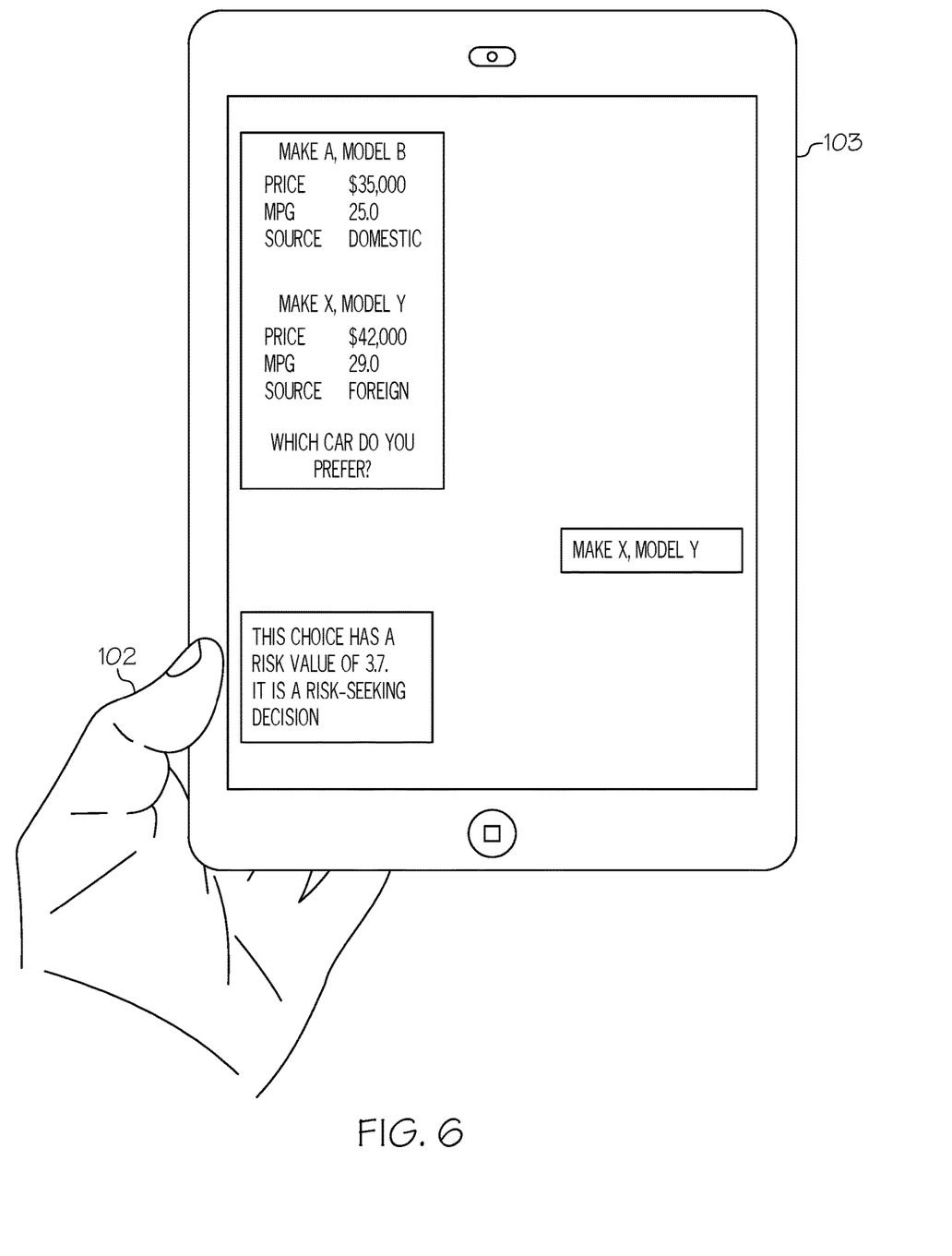
FIG. 6 schematically depicts an example choice option presented on a user device of the system of FIG. 2, according to one or more embodiments shown and described herein.

FIG. 3 depicts flowchart for a method 300 of assessing the risk of a potential decision. The method 300 may be executed based on instructions stored in the memory module 204 that are executed by the processor 202. FIGS. 4-6 schematically depict example user 102 interactions with the user device 103 through the interface module 146 (FIG. 2) according to the method 300 of operation of the system 100.

Referring now to FIGS. 1-4, at block 302 of the method 300, the system 100 determines one or more values of the user 102. At block 302 the system 100 may receive input from the user 102 indicating the values of the user 102. In some examples, instead of or in addition to, receiving input from the user 102, the system 100 may predict one or values of the user 102 based on user-specific or community data. In some embodiments, when using the risk assessment system 100 for the first time, the user 102 may create a user profile to initially provide the system 100 with values of the user 102. The user 102 may also access the user profile at any point in the future to adjust one or more values of the user 102.

With particular reference to FIG. 4, an example user profile screen is depicted on the user device 103. The user 102 may select a value from a drop-down menu listing a plurality of potential values. In other embodiments, the user 102 may type a value into a text box. While FIG. 4 depicts the user 102 directly providing the system 100 with one or more values of the user 102, as noted above, the user 102 may also instruct the system 100 to predict the values of the user 102 through an input on the user device 103.

Referring again to FIGS. 1-4, at block 304 of the method 300, the system 100 determines a weight of each user value to generate one or more weighted user values. At block 304 the system 100 may receive input from the user 102 indicating the weights of the values of the user 102. In some examples, instead of, or in addition to, receiving input from the user 102, the system 100 may predict the weights of one or more values of the user 102 based on user-specific or community data. In some embodiments, when using the risk assessment system 100 for the first time, the user 102 may create a user profile to initially provide the system 100 with weights of values of the user 102. The user 102 may also access the user profile at any point in the future to adjust the weights of the one or more values of the user 102.

With particular reference to FIG. 4, an example user profile screen is depicted on the user device 103. The user 102 may select a weight from a drop-down menu listing a plurality of potential weights. The weights may be numeric values, descriptive words (e.g. low, medium, high), shades of colors (e.g. a darker shade indicating a greater weight of the value), and the like. In other embodiments, the user 102 may type a weight into a text box. As shown in FIG. 4, the user 102 may assign a weight of "3" to an "environmental friendliness" value. On the exemplary 1-5 scale depicted in FIG. 4, a weight of "3" may indicate that environmental friendliness is moderately important to the user 102. A weight of "5" may indicate a high importance, and a weight of "1" may indicate a low importance, for instance. It should be appreciated that such a numeric scale is merely an example, however, and that the ranges of the scale may take any desirable value.

While FIG. 4 depicts the user 102 directly providing the system 100 with a weight to a value of the user 102, as noted above, the user 102 may also instruct the system 100 to predict the weights of the values of the user 102 through an input on the user device 103. For instance, the user may instruct the system 100 to predict the weights of the user values through personal data and/or community data, as indicated by the "determine weights from personal data" and "determine weights from others" options depicted in FIG. 4. In some embodiments, when generating a user profile, the user 102 may simply instruct the system 100 to assign equal weights to the values of the user 102. For instance, the user 102 may select cost savings, environmental friendliness, and locally sourced/manufactured products as values of the user 102. By instructing the system 100 to assign equal weights to the values, the system may assign a moderate importance, or score of "3," to each of the selected values. As the user 102 uses the system 100, the system may learn and tailor the weights of the values of the user 102 based on the answers provided to choice options and prompts requiring a decision, as mentioned above and discussed in additional detail below.

Referring again to FIGS. 1-4, at block 306 of the method 300, the system 100 generates a risk-neutral utility function based on the one or more weighted user values. The risk-neutral utility function may be a linear combination of the weighted values of the user 102. The risk-neutral utility function represents a decision of the user 102 having no risk. Merely as an example, if the user 102 assigns a weight of "5" to cost savings, a weight of "3" to environmental friendliness, and a weight of "1" to locally sourced/manufactured products, the risk-neutral utility function would effectively indicate that when making a decision, the user 102 should highly consider (or be influenced by) cost savings, moderately consider environmental friendliness, and slightly consider locally sourced/manufactured products.

Referring now to FIGS. 1-5, at block 308 of the method 300, the system 100 determines a prompt requiring a decision. At block 308 the system 100 may receive input from the user 102 indicating the prompt requiring a decision. For instance, the user 102 may type a prompt requiring a decision, input a prompt requiring a decision through voice commands, or provide the system 100 with a prompt through a still image or video taken with a camera of the user device 103, for instance. In some examples, instead of, or in addition to, receiving input from the user 102, the system 100 may predict a prompt requiring a decision. For instance, the system 100 may determine a prompt requiring a decision based on a search history of the user 102 on the user device 103, electronic receipts stored on the user device 103, emails or other communications on the user device 103, and the like. Based on such information the system 100 may determine that the user 102 is considering buying a vehicle, buying a house, taking a vacation, and the like. The system 100 may present an initiating prompt or user inquiry regarding the predicted prompt requiring a decision, asking the user 102 if she would like to initiate a risk assessment exercise regarding the predicted prompt requiring a decision.

With particular reference to FIG. 5, an example interaction between the user 102 and the system 100 through the interface module 146 of the user device 103 is depicted. Text communications generated by the system 100 appear on the left of the user device 103, and text communications provided by the user 102 appear on the right of the user device 103. By the user 102 indicating that she is interested in buying a car, and is considering a first vehicle (make A, model B) and a second vehicle (make X, model Y), the system 100 may determine that the prompt requiring a decision is whether to buy the first vehicle or the second vehicle. In some cases, the user 102 may not know which specific vehicles she is interested in purchasing. For instance, the user 102 may respond "no" to the system inquiry, "Do you know what car or cars you are considering to purchase?" In such cases, the system 100 may provide the user 102 with further questions to determine a prompt requiring a decision. For instance, the system 100 may ask, "Do you know if you want to buy a truck, sedan, or sports vehicle?" If the user 102 answers "no," the system 100 may generate choice options relating these and other generic vehicle types.

Based on the risk assessment of the user answers to the choice options and the generic prompt requiring a decision, the user 102 may continue the risk assessment exercise with a more specific prompt requiring a decision. For instance, the user 102 may determine she wishes to buy a sports car, and the system 100 may then ask if the user 102 knows which make or year of sports car she wants to buy. Such an iterative process may continue until the user 102 determines a specific vehicle to purchase or no longer wishes to continue with the risk assessment exercise.

Referring now to FIGS. 1-6, at block 310 of the method 300, the system 100 generates one or more choice options related to the one or more user values and pertaining to the prompt requiring a decision. Referring particularly to FIG. 6, a choice option is presented for purchasing the first vehicle (make A, model B) and the second vehicle (make X, model Y) in response to the prompt requiring a decision determined at block 308. At block 302, the system 100 may have determined that the values of the user 102 are cost savings, environmental friendliness, and locally sources/manufactured products. Therefore, the choice option presented provides statistics, data, and information on the first and second vehicle related to these values. For instance, and as shown in FIG. 6, the choice option displays the price, miles per gallon, and manufacturing source of the first and second vehicles.

It should be appreciated that the choice option may present multiple data points related to each value. For instance, the system 100 may present the purchase price and the average cost of repair of the vehicles as information related to cost savings. In the example depicted in FIG. 6, a single choice option is presented including information on the vehicles related to all of the values of the user 102. However, the system 100 may also present a choice option related to each individual value of the user 102. For instance, the system may first present information on the vehicles related to cost savings in a first choice option and ask the user 102 to indicate a preference between the vehicles based on the first choice option. The system may further present information on the vehicles related to environmental friendliness in a second choice option and ask the user 102 to indicate a preference between the vehicles based on the second choice option.

Referring again to FIGS. 1-6, at block 312 of the method 300, the system 100 receives a user selection to the one or more choice options. The user selections are provided as answers to the choice options indicating a preference between the first and second vehicle, for instance. In cases where a single choice option is presented related to all of the determined values of the user 102, as depicted in FIG. 6, the user 102 may answer the choice option by indicating a vehicle preference, and the answer to the choice option is therefore also the answer to the prompt requiring a decision.

In cases where multiple choice options are presented, each related to a single value of the user 102, the system 100 may determine that the ultimate decision to the prompt requiring a decision is the decision that receives the most "votes" or answers to choice options. That is, the system 100 may present a first choice option related to the cost savings of the first and second vehicles, a second choice option related to the environmental friendliness of the first and second vehicles, and a third choice option related to the source of manufacture of the first and second vehicles. If the user 102 answers that she prefers to purchase the first vehicle in response to the first and second choice options and answers that she prefers to purchase the second vehicle in response to the third choice option, the system may determine that the ultimate decision to the prompt requiring a decision is a preference to purchase the first vehicle, as the first vehicle received two "votes" in comparison to one "vote" for the second vehicle based on the answers to the choice options. Referring specifically to the example depicted in FIG. 6, the user 102 responds to the choice option by indicating a preference to purchase the second vehicle (make X, model Y) over the first vehicle (make A, model B).

Referring again to FIGS. 1-6, at block 314 of the method 300, the system 100 generates an expected utility function based on the user selections to the one or more choice options. The expected utility function represents a combination of weighted values of the user 102 based on the responses to the choice options. In other words, the expected utility function effectively represents what values the user 102 is actually considering in answering the choice options, and to what extent the user 102 is weighing or considering each of the values. For instance, in the example depicted in FIGS. 4-6, the user 102 may assign a weight of "5" to cost savings, a weight of "3" to environmental friendliness, and a weight of "1" to locally sourced/manufactured products (at blocks 302, 304 of the method 300, for instance), indicating that when making a decision, the user 102 should highly consider (or be influenced by) cost savings, moderately consider environmental friendliness, and slightly consider locally sourced/manufactured products.

As depicted in FIG. 6, the user 102 indicates a preference to purchase the second vehicle (make X, model Y) over the first vehicle (make A, model B). As depicted in FIG. 6, the second vehicle is more expensive than the first vehicle, the second vehicle is more fuel-efficient than the first vehicle, and the second vehicle is made by a foreign manufacturer, while the first vehicle is made by a domestic manufacturer. Based on the indication of a preference to purchase the second vehicle based on the selections to the one or more choice options, the system 100 may determine that the user 102, is in fact, moderately considering cost savings, moderately considering environmental friendliness, and slightly considering locally sourced/manufactured products. The system 100 may then generate the expected utility function as a combination of these values and weights indicated by the selections to the choice options provided by the user 102.

Referring again to FIGS. 1-6, at block 316 of the method 300, the system 100 compares the expected utility function generated at block 314 to the risk-neutral utility function generated at block 306. As discussed with reference to FIG. 2, the comparison may generally be determining a distance between a curve generated from the risk-neutral utility function and a curve generated from the expected utility function in space.

Referring still to FIGS. 1-6, at block 318 of the method 300, the system 100 assesses the risk of a potential decision based on the comparison between the expected utility function and the risk-neutral utility function. As discussed with reference to FIG. 2, based on the magnitude of the distance between the expected utility function curve and the risk-neutral utility function curve, the system 100 may determine whether the potential decision to the prompt requiring a decision indicated by the answers to the choice options is a risk or not. The system 100 may present the user 102 with a simple determination on whether the potential decision is a risk or not. For instance, the system 100 may present a message to the user 102, "This choice is a risk." The system 100 may also present a score of the potential decision. The score may simply be the distance measured between the expected utility function and the risk-neutral utility function. The distance may also be normalized on a scale to present the risk score or value that relates to the measured distance.

Depending on the direction of error, or the orientation of the distance, between the risk-neutral utility function and the expected utility function, for instance, the system 100 may also determine if a potential decision to the prompt requiring a decision is risk-seeking or risk-averse. In the example depicted in FIG. 6, based on the user 102 weighing cost savings less than anticipated based on the determined weighted values of the user 102, the system 100 may determine that the decision to purchase the second vehicle (make X, model Y) over the first vehicle (make A, model B) is a risk-seeking decision with a specific risk value.

Referring still to FIGS. 1-6, at block 320 of the method 300, the system 100 may determine a decision to the prompt requiring a decision that minimizes risk. For instance, the system 100 may generate an expected utility function for all potential decisions to the prompt requiring a decision, determine the expected utility function that most closely aligns with the risk-neutral utility function, and present the decision associated with the close-aligning expected utility function as the decision that minimizes risk for the user 102.

In some cases, the system 100 may only analyze the potential decisions being directly considered by the user 102. For instance, in the example depicted in FIGS. 4-6, the system 100 may only consider expected utility functions related to decisions to purchase the first vehicle (make A, model B) or the second vehicle (make X, model Y). The system 100 may further determine that the expected utility function associated with the decision to purchase the first vehicle more closely aligns with the risk-neutral utility function than the expected utility function associated with the decision to purchase the second vehicle. Accordingly, the decision to purchase the first vehicle is less risky than the decision to purchase the second decision.

In other cases, the system 100 may generate expected utility functions for potential decisions to the prompt requiring a decision that were not directly presented to the user. For instance, based on data accessed from the external device 130 and/or data storage component 206, the system 100 may generate an expected utility function for a third vehicle (make M, model N, for instance) that the user 102 is not currently considering based on the presented choice options. The system 100 may determine that the expected utility function associated with the third vehicle, in fact, most closely aligns with the risk-neutral utility function, indicating that the user 102 may wish to consider the third vehicle for purchase even she is not currently considering or aware of the third vehicle.

Still referring to FIGS. 1-6, at block 322 of the method 300, the system 100 may display the risk of the potential decision and/or the decision that minimizes risk on the user device 103. In the example depicted in FIG. 6, the system 100 displays a risk value associated with the decision to purchase the second vehicle (make X, model Y) over the first vehicle (make A, model B) and the determination that the potential decision is risk-seeking. The system 100 may also present an indication to the user 102 that a decision to purchase the first vehicle would minimize risk. As explained above, the system 100 may also apprise the user 102 that a third vehicle not yet considered by the user 102 most closely aligns with the risk-neutral utility function and would minimize risk for the user 102.

Still referring to FIGS. 1-6, at block 324 of the method 300, the system 100 re-determines the weight of each weighted user value and the risk-neutral utility function based on the user selections to the one or more choice options. The system 100 may re-determine the weights of the user values and the risk-neutral utility function based on the immediately completed risk assessment exercise or provided decision to the prompt requiring a decision. In other cases, the system 100 may re-determine the weights of the user values and the risk-neutral utility function based on the five most recent risk assessment exercises or provided decisions to prompts requiring a decision, for example.

The system 100 may improve the accuracy of the weighted user values and the risk-neutral utility function based on the user-provided selections and answers to the choice options and prompts requiring a decision. For instance, when generating a profile, the user 102 may indicate that cost savings is a very important value to her, assigning a weight of "5" to the value. However, during risk assessment exercises, the user 102 may continuously show a preference for expensive decisions, or decisions that, at least, do not strongly value cost savings. Based on these responses, the system 100 may determine that cost savings is not, in fact, a highly important value to the user 102.

Over time, therefore, the system 100 may adjust the originally assigned weight of the cost savings value to more closely align with the decision-making tendencies regularly displayed by the user 102. That is, the system 100 may adjust the weight of the cost savings value to a "4" if the user 102 regularly shows disregard for cost savings when making decisions. With the re-determined weights of the values of the user 102, the system 100 may also re-determine the risk-neutral utility function based on the weighted user values. Over time, the risk-neutral utility function may be tailored to accurately capture the true values of the user 102 and to what extent the user 102 actually weighs each value.

It should be appreciated that the method 300 discussed above is not limited to the order of steps presented in FIG. 3. For instance, in some embodiments, the risk-neutral utility function generated at block 306 may be generated any time prior to the comparison of the expected utility function to the risk-neutral utility function at block 316. It should also be appreciated that steps presented in FIG. 3 need to not be discrete in all embodiments. That is, the system 100 may determine one or more user values and determine a weight of each user value to generate one or more weighted values substantially simultaneously, such that blocks 302 and 304 may be considered a single step in the method 300. Moreover, it should be appreciated that one or more steps of the method 300 depicted in FIG. 3 may be omitted from the method 300. For instance, in some embodiments, the system 100 may not determine a decision that minimizes risk at block 320. Additionally, one or more steps not presented in the method 300 depicted in FIG. 3 may be completed by the system 100.

Based on the foregoing, it should now be understood that embodiments shown and described herein relate to systems and methods for determining a risk of a potential decision. The system collects data on a user to determine one or more values of the user that influence the user's decision-making process. The system also collects data to determine a weight of each of the values, indicating an extent to which the user considers each value when making a decision. Based on the weighted values, the system generates a risk-neutral utility function, indicating a perfectly neutral decision-making process that appropriately considers each value of the user.

The system compares a potential decision to the risk-neutral utility function to determine the risk of the potential decision. More particularly, the system determines a prompt, or ultimate question the user desires guidance on, requiring a decision. The system then presents the user with one or more choice options pertaining to the prompt requiring a decision and related to the user values. That is, the choice options provide information on the prompt requiring a decision that relate to the values of the user, and the answers or selections to the choice options provide clarity to the user and the system as to what potential decision the user is likely to make.

The system may generate an expected utility function based on the answers to the choice options, indicating what values were, in fact, considered by the user, and to what extent, when answering the choice options. By comparing the risk-neutral utility function and the expected utility function, the system may then determine the risk of the potential decision, or the extent that the potential decision deviates from a risk-neutral, anticipated decision or decision-making process of the user.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the specific value or end-point referred to is included. Whether or not a numerical value or end-point of a range in the specification recites "about," two embodiments are described: one modified by "about," and one not modified by "about." It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply ab solute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

For the purposes of describing and defining the present subject matter, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is noted that recitations herein of a component of the present disclosure being "configured" or "programmed" in a particular way, to embody a particular property, or function in a particular manner, are structural recitations, as opposed to recitations of intended use. More specifically, the references herein to the manner in which a component is "programmed" or "configured" denotes an existing physical condition of the component and, as such, is to be taken as a definite recitation of the structural characteristics of the component.

It is noted that terms like "preferable," "typical," and "suitable" when utilized herein, are not utilized to limit the scope of the claimed subject matter or to imply that certain features are critical, essential, or even important to the structure or function of the claimed subject matter. Rather, these terms are merely intended to identify particular aspects of an embodiment of the present disclosure or to emphasize alternative or additional features that may or may not be utilized in a particular embodiment of the present disclosure.

For the purposes of describing and defining the present subject matter it is noted that the terms "substantially" and "approximately" are utilized herein to represent the inherent degree of uncertainty that may be attributed to any quantitative comparison, value, measurement, or other representation. The terms "substantially" and "approximately" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

What is claimed is:

1. A method implemented by a processor of a device, the method comprising:
   determining one or more user values;
   determining a prompt requiring a decision;
   receiving a user selection in response to one or more choice options presented to a user, wherein the one or more choice options are related to the one or more user values and pertaining to the prompt requiring a decision;
   comparing the user selection to a risk-neutral utility function;
   generating an expected utility function based on the user selection, the expected utility function taking into account a plurality of user-assigned weights for a plurality of respective categories associated with the one or more choice options for the user to make the decision;
   comparing the expected utility function to the risk-neutral utility function;
   assessing a risk of a potential decision based on the comparison by evaluating a degree of risk of the potential decision including plotting a first curve generated from the risk-neutral utility function and a second curve generated from the expected utility function, and measuring a distance between the first curve and the second curve that corresponds to the degree of risk of the potential decision; and predicting the plurality of user-assigned weights based on user-specific data and community data to provide initial weights of the one or more user values.

2. The method of claim 1, further comprising:
generating the risk-neutral utility function based on the one or more user values.

3. The method of claim 1, wherein the potential decision is a decision to the prompt requiring a decision.

4. The method of claim 1, further comprising:
determining a weight of each user value to generate one or more weighted user values; and
generating the risk-neutral utility function as a linear combination of each weighted user value.

5. The method of claim 4, further comprising:
determining an updated weight of each user value based on the user selection to the one or more choice options.

6. The method of claim 1, wherein assessing the risk of the potential decision based on the comparison further comprises:
determining whether the potential decision is risk-seeking or risk-averse.

7. The method of claim 1, further comprising:
capturing an image and generating the prompt requiring the decision based on the captured image.

8. The method of claim 1, wherein the one or more choice options are presented to the user via at least one of an audial interface or a visual interface, and wherein the user selection is received via at least one of the audial interface or the visual interface.

9. The method of claim 1, further comprising receiving, as input, the plurality of user-assigned weights that are learned and readjusted over a predetermined time period.

10. The method claim 1, further comprising receiving, as input, the plurality of user-assigned weights via a drop-down menu or a text box, wherein the plurality of user-assigned weights indicate a degree of importance over a predetermined range.

11. A system comprising:
a device including a processor configured to:
determine one or more user values;
determine a prompt requiring a decision;
receive a user selection in response to one or more choice options presented to a user, wherein the one or more choice options are related to the one or more user values and pertaining to the prompt requiring a decision;
compare the user selection to a risk-neutral utility function;
assess a risk of a potential decision based on the comparison by evaluating a degree of risk of the potential decision including plotting a first curve generated from the risk-neutral utility function and a second curve generated from the expected utility function, and measuring a distance between the first curve and the second curve that corresponds to the degree of risk of the potential decision; and
predict the plurality of user-assigned weights based on user-specific data and community data to provide initial weights of the one or more user values.

12. The system of claim 11, wherein the processor is further configured to:
generate the risk-neutral utility function based on the one or more user values.

13. The system of claim 11, wherein the processor is further configured to:
determine a weight of each user value to generate one or more weighted user values; and
generate the risk-neutral utility function as a linear combination of each weighted user value.

14. The system of claim 13, wherein the processor is further configured to:
determine an updated weight of each user value based on the user selection to the one or more choice options.

15. The system of claim 11, wherein the processor is further configured to:
capture an image and generate the prompt requiring the decision based on the captured image.

16. The system of claim 11, wherein the one or more choice options are presented to the user via at least one of an audial interface or a visual interface, and wherein the user selection is received via at least one of the audial interface or the visual interface.

17. A processor of a computing device, the processor configured to:
determine one or more user values;
determine a prompt requiring a decision;
receive a user selection in response to one or more choice options presented to a user, wherein the one or more choice options are related to the one or more user values and pertaining to the prompt requiring a decision;
compare the user selection to a risk-neutral utility function;
generate an expected utility function based on the user selection, the expected utility function taking into account a plurality of user-assigned weights for a plurality of respective categories associated with the one or more choice options for the user to make the decision;
compare the expected utility function to the risk-neutral utility function;
assess a risk of a potential decision based on the comparison by evaluating a degree of risk of the potential decision including plotting a first curve generated from the risk-neutral utility function and a second curve generated from the expected utility function, and measuring a distance between the first curve and the second curve that corresponds to the degree of risk of the potential decision; and
predict the plurality of user-assigned weights based on user-specific data and community data to provide initial weights of the one or more user values.

18. The processor of claim 17, further configured to:
generate the risk-neutral utility function based on the one or more user values.

19. The processor of claim 17, further configured to:
determine a weight of each user value to generate one or more weighted user values;
generate the risk-neutral utility function as a linear combination of each weighted user value; and
determine an updated weight of each user value based on the user selection to the one or more choice options.

* * * * *